United States Patent Office 3,650,949
Patented Mar. 21, 1972

3,650,949
CYANIDE REMOVAL
Donald Gene Hager, Pittsburgh, and Joseph Leo Rizzo, Pitcairn, Pa., assignors to Calgon Corporation, Pittsburgh, Pa.
No Drawing. Filed Dec. 24, 1969, Ser. No. 888,026
Int. Cl. B01d 15/00, 23/14
U.S. Cl. 210—36                                    5 Claims

ABSTRACT OF THE DISCLOSURE

Method of removing cyanide from water are disclosed in which copper salts and oxygen are added to the water upstream of a bed of activated carbon. The copper and cyanide form a complex of uncertain composition. The copper complexed cyanide thus formed is adsorbed on the activated carbon, which catalyzes the oxidation of the cyanide to carbon dioxide and nitrogen.

BACKGROUND OF THE INVENTION

Because of its toxicity, the cyanide ion is one of the more obnoxious of pollutants in industrial waste waters. It is produced as a waste product primarily by the steel, chemical and electroplating industries. A truly economical method for its removal from industrial waste water had not been developed prior to the present invention.

Copper-impregnated activated carbon has been used in the past for various catalytic oxidation processes. It is known, too, that cyanide can be removed from water by adsorption techniques. Reference is made to an article entitled, "Decontamination of Cyanide Wastes by Methods of Catalytic Oxidation and Adsorption" by Wilhelm Bucksteeg, which was published as part of the 21st Purdue University Conference in 1966. The Bucksteeg article discusses the adsorption of cyanide by coke.

SUMMARY OF THE INVENTION

Our invention contemplates the removal of cyanide from water through the steps of maintaining in the water certain levels of cupric ion and oxygen, and passing the water containing the cyanide, cupric ion and oxygen into a bed of activated carbon of an appropriate size and depth. The effluent will, so long as the carbon is not exhausted or contaminated with other substances, contain virtually no cyanide. The copper may be pre-impregnated in the activated carbon, but we have found that it is not necessary to employ such pre-impregnated carbon. The copper may be introduced into the water either in the cupric or cuprous form, but is more conveniently introduced in the cupric form. We believe the cupric copper is reduced to the cuprous form. It is not certain at what point the cupric copper is reduced to the cuprous form, but in any event the copper-complexed cyanide is adsorbed on the activated carbon.

The oxygen may be introduced by simply bubbling air or oxygen into the water to increase its dissolved oxygen content to at least 6.0 mg./l. and to maintain an excess of $O_2$ over the cyanide content such that the effluent from the carbon bed contains at least 4.0 mg./l. $O_2$.

To demonstrate our invention, a series of experiments were run in three activated carbon columns. In the following tables representing the results of the tests, water having the pH, dissolved oxygen, cyanide, and $Cu^{++}$ content indicated under "make-up before run" was passed through one of three carbon columns set up for the purpose of the test.

In column 1, the carbon was previously impregnated with 7.0 percent by weight of copper, except in the case of run 6. The carbon in columns 2 and 3 were not previously impregnated.

Where no copper was being fed and none was previously impregnated in the carbon, such as in column 2, run 2, and in run 7, it may be observed that the carbon alone, with or without significant amounts of dissolved oxygen, will remove cyanide for a short time, but copper is necessary for efficient cyanide destruction over longer periods of time.

RUN NUMBER 1

Flow rate, 0.2 gallon/minute/cubic foot; superficial contact time, 37.5 minutes; dissolved oxygen: 7.7 mg./l.]

|  | Make-up before run | Make-up after run | 2 hour effluent | 4 hour effluent | 6 hour effluent | 8 hour effluent |
|---|---|---|---|---|---|---|
| Column No. 1:[1] |  |  |  |  |  |  |
| pH | 9.8 | 9.5 | 8.6 | 8.6 | 8.5 | 8.5 |
| $CN^-$ (mg./l.) | 18 | 19 | 0.19 | 0.04 | 0.10 | ≤0.002 |
| $Cu^{++}$ (mg./l.) | 0.20 | 0.15 | --- | 1.35 | 0.95 | 0.70 |
| Column No. 2: |  |  |  |  |  |  |
| pH | 9.8 | 9.5 | 7.8 | 9.9 | 7.8 | 7.6 |
| $CN^-$ (mg./l.) | 18 | 19 | 0.02 | 0.10 | 0.16 | 1.0 |
| $Cu^{++}$ (mg./l.) | 0.20 | 0.15 | --- | <0.05 | <0.05 | <0.05 |
| Column No. 3: |  |  |  |  |  |  |
| pH | 7.0 | 7.0 | 7.6 | 8.2 | 7.5 | 7.3 |
| $CN^-$ (mg./l.) | 14 | 16 | 0.15 | 0.008 | 0.064 | 0.060 |
| $Cu^{++}$ (mg./l.) | 14.7 | 14.7 | --- | <0.05 | <0.05 | <0.05 |

[1] Copper-impregnated carbon.

RUN NUMBER 2

[Flow rate, 0.4 gallon/minute/cubic foot; superficial contact time, 18.75 minutes; dissolved oxygen, 7.8 mg./l.]

|  | Make-up before run | Make-up after run | 2 hour effluent | 4 hour effluent | 6 hour effluent | 8 hour effluent |
|---|---|---|---|---|---|---|
| Column No. 1:[1] |  |  |  |  |  |  |
| pH | 9.8 | 9.8 | 8.9 | 9.1 | 9.2 | 9.3 |
| $CN^-$ (mg./l.) | 19 | 19 | 0.038 | 0.07 | <0.002 | 0.25 |
| $Cu^{++}$ (mg./l.) | 0.15 | 0.15 | 0.65 | 0.35 | 0.25 | 0.15 |
| Column No. 2: |  |  |  |  |  |  |
| pH | 9.8 | 9.8 | 7.8 | 7.4 | 8.2 | 8.9 |
| $CN^-$ (mg./l.) | 20 | 19 | 0.20 | 3.6 | 6.7 | 7.5 |
| $Cu^{++}$ (mg./l.) | <0.05 | 0.10 | <0.05 | <0.05 | 0.10 | 0.10 |
| Column No. 3: |  |  |  |  |  |  |
| pH | 7.2 | 7.2 | 7.9 | 7.8 | 7.8 | 7.9 |
| $CN^-$ (mg./l.) | 17 | 17 | 0.004 | 0.02 | <0.002 | 0.17 |
| $Cu^{++}$ (mg./l.) | 13.7 | 13.7 | <0.05 | <0.05 | <0.05 | <0.05 |

[1] Copper-impregnated carbon.

RUN NUMBER 3

[Flow rate, 0.2 gallon/minute/cubic foot; superficial contact time, 37.5 minutes; dissolved oxygen, 8.4 mg./l.]

|  | Make-up before run | Make-up after run | 2 hour effluent | 4 hour effluent | 6 hour effluent | 8 hour effluent |
|---|---|---|---|---|---|---|
| Column No. 1:[1] | | | | | | |
| pH | 9.5 | 9.5 | 8.5 | 8.6 | 8.5 | 8.5 |
| $CN^-$ (mg./l.) | 9.4 | 9.5 | 0.005 | 0.026 | <0.002 | 0.086 |
| $Cu^{++}$ (mg./l.) | 0.15 | 0.05 | 1.30 | 0.75 | 0.55 | 0.40 |
| Column No. 2: | | | | | | |
| pH | 9.7 | 9.6 | 7.6 | 7.5 | 7.8 | 8.0 |
| $CN^-$ (mg./l.) | 9.1 | 9.3 | <0.002 | 0.055 | 0.139 | <0.002 |
| $Cu^{++}$ (mg./l.) | <0.05 | <0.05 | <0.05 | <0.05 | <0.05 | <0.05 |
| Column No. 3: | | | | | | |
| pH | 7.5 | 7.6 | 7.6 | 7.5 | 7.7 | 7.7 |
| $CN^-$ (mg./l.) | 8.0 | 8.1 | 0.097 | <0.002 | <0.002 | <0.002 |
| $Cu^{++}$ (mg./l.) | 7.0 | 7.0 | <0.05 | <0.05 | <0.05 | <0.05 |

[1] Copper-impregnated carbon.

RUN NUMBER 4

[Flow rate, 0.4 gallon/minute/cubic foot; superficial contact time, 18.75 minutes; dissolved oxygen, 8.4 mg./l.]

|  | Make-up before run | Make-up after run | 2 hour effluent | 4 hour effluent | 6 hour effluent | 8 hour effluent |
|---|---|---|---|---|---|---|
| Column No. 1:[1] | | | | | | |
| pH | 9.6 | 9.6 | 8.6 | 8.7 | 8.8 | |
| $CN^-$ (mg./l.) | 9.5 | 9.5 | 0.036 | 0.047 | 0.013 | |
| $Cu^{++}$ (mg./l.) | 0.10 | 0.10 | <0.50 | <0.30 | <0.20 | |
| Column No. 2: | | | | | | |
| pH | 9.6 | 9.5 | 7.9 | 7.9 | 8.0 | |
| $CN^-$ (mg./l.) | 10.6 | 11.0 | <0.010 | 0.210 | 0.120 | |
| $Cu^{++}$ (mg./l.) | <0.05 | <0.05 | <0.05 | <0.05 | <0.05 | |
| Column No. 3: | | | | | | |
| pH | 7.9 | 7.8 | 7.8 | 7.9 | 8.0 | |
| $CN^-$ (mg./l.) | 9.5 | 9.4 | 0.190 | 0.032 | 0.010 | |
| $Cu^{++}$ (mg./l.) | 7.0 | 7.0 | <0.05 | <0.05 | <0.05 | |

[1] Copper-impregnated carbon.

RUN NUMBER 5

[Flow rate, 0.4 gallon/minute/cubic foot; superficial contact time, 18.75 minutes; dissolved oxygen, 8.2 mg./l.]

|  | Make-up before run | Make-up after run | 2 hour effluent | 4 hour effluent | 6 hour effluent | 8 hour effluent |
|---|---|---|---|---|---|---|
| Column No. 1:[1] | | | | | | |
| pH | 9.4 | 9.4 | 8.6 | 8.7 | 8.8 | |
| $CN^-$ (mg./l.) | 7.6 | 7.5 | 0.045 | 0.005 | 0.130 | |
| $Cu^{++}$ (mg./l.) | <0.05 | <0.05 | 0.40 | 0.20 | 0.05 | |
| Column No. 2: | | | | | | |
| pH | 9.5 | 9.4 | 8.1 | 8.2 | 8.3 | |
| $CN^-$ (mg./l.) | 7.6 | 7.5 | 0.210 | 0.053 | 0.014 | |
| $Cu^{++}$ (mg./l.) | <0.05 | <0.05 | <0.05 | <0.05 | <0.05 | |
| Column No. 3: | | | | | | |
| pH | 8.6 | 8.4 | 8.0 | 8.0 | 8.2 | |
| $CN^-$ (mg./l.) | 8.3 | 7.3 | 0.054 | 0.012 | 0.081 | |
| $Cu^{++}$ (mg./l.) | 4.0 | 4.0 | <0.05 | <0.05 | <0.05 | |

[1] Copper-impregnated carbon.

RUN NUMBER 6

[Flow rate, 0.4 gallon/minute/cubic foot; superficial contact time, 18.75 minutes]

|  | Make-up before run | Effluent (hours) | | | | | | | | | | | | | |
|---|---|---|---|---|---|---|---|---|---|---|---|---|---|---|---|
|  |  | 2 | 4 | 6 | 8 | 10 | 12 | 14 | 16 | 23½ | 27½ | 31½ | 35½ | 39½ | 44 |
| Column No. 1: | | | | | | | | | | | | | | | |
| pH | 9.6 | 7.5 | 8.0 | 8.5 | 9.0 | 9.7 | 9.9 | 10.0 | 10.0 | 9.9 | 9.9 | 9.8 | 9.7 | 9.7 | 9.6 |
| $CN^-$ (mg./l.) | 11.8 | .068 | .130 | .800 | 1.60 | 2.5 | 2.3 | 3.3 | 3.4 | 3.4 | 3.0 | 2.8 | 2.9 | 3.0 |
| $Cu^{++}$ (mg./l.) | .20 | <.05 | <.05 | <.05 | <.05 | <.05 | <.05 | <.05 | <.05 | <.05 | <.05 | <.05 | <.05 | <.05 | <.05 |
| Dissolved oxygen | 7.9 | 4.2 | 4.6 | 4.0 | 4.5 | 4.2 | 4.3 | 4.6 | 4.2 | 5.0 | 4.2 | 3.9 | 4.0 | 4.4 | 3.6 |
| Column No. 2: | | | | | | | | | | | | | | | |
| pH | 5.9 | 7.8 | 8.0 | 8.1 | 8.5 | 8.9 | 9.4 | 9.6 | 9.7 | 9.7 | 9.8 | 9.7 | 9.6 | 9.6 | 9.4 |
| $CN^-$ (mg./l.) | 9.6 | .145 | .250 | .052 | .011 | .027 | .092 | .140 | .260 | .029 | .048 | .110 | .088 | .200 | .039 |
| $Cu^{++}$ (mg./l.) | 13.5 | <.05 | <.05 | <.05 | <.05 | <.05 | <.05 | <.05 | <.05 | <.05 | <.05 | <.05 | <.05 | <.05 | <.05 |
| Dissolved oxygen | 8.0 | 4.2 | 4.9 | 4.3 | 4.4 | 4.5 | 4.3 | 4.4 | 4.6 | 4.4 | 4.0 | 3.9 | 4.6 | 4.7 | 4.2 |

RUN NUMBER 7

[Flow rate, 0.2 gallon/minute/cubic foot; superficial contact time, 37.5 minutes]

|  | Make-up before run | Make-up after run | Effluent (hours) | | | | | | | | | | |
|---|---|---|---|---|---|---|---|---|---|---|---|---|---|
|  |  |  | 4 | 8 | 12 | 16 | 24 | 28 | 32 | 36 | 40 | 48 | 52 |
| Column No. 1: | | | | | | | | | | | | | |
| pH | 10.1 | 10.1 | 9.7 | 10.1 | 10.1 | 10.1 | 10.1 | 10.0 | 10.0 | 10.0 | 10.1 | 10.1 | 10.0 |
| $CN^-$ (mg./l.) | 49.5 | 49.5 | | 36.5 | | 36.0 | 36.0 | | 36.0 | | 36.5 | 36.3 | |
| $Cu^{++}$ (mg./l.) | .15 | .05 | <.05 | <.05 | .05 | .05 | .05 | .05 | .05 | .05 | .05 | .10 | .05 |
| Dissolved oxygen | 8.2 | 8.0 | 3.8 | 3.8 | 3.4 | 3.3 | 4.0 | 4.0 | 3.6 | 3.8 | 3.9 | 3.9 | 4.0 |

RUN NUMBER 8

[Flow rate, 0.3 gallon/minute/cubic foot; superficial contact time, 25 minutes]

| | Make-up before run | Make-up after run | Effluent (hours) | | | | | | | | | | | |
|---|---|---|---|---|---|---|---|---|---|---|---|---|---|---|
| | | | 4 | 8 | 12 | 16 | 24 | 28 | 32 | 36 | 40 | 49 | 52 | 56 |
| Column No. 1: | | | | | | | | | | | | | | |
| pH | 7.2 | 7.0 | 7.9 | 7.6 | 8.2 | 8.5 | 8.4 | 8.0 | 7.5 | 7.9 | 7.8 | 7.2 | 7.6 | 7.6 |
| $CN^-$ (mg./l.) | 8.4 | 8.8 | .145 | .185 | .135 | .024 | .015 | .035 | <.002 | .013 | <.002 | .029 | .007 | .04 |
| $Cu^{++}$ (mg./l.) | 7.0 | 6.3 | | | | | | <.05 | <.05 | <.05 | <.05 | <.05 | <.05 | <.05 |
| Dissolved oxygen | 8.6 | 8.0 | 5.0 | 5.4 | 5.8 | 6.0 | 6.2 | 5.8 | 5.6 | 5.5 | 5.9 | 5.6 | 5.9 | 5.8 |

If the cyanide is over 10 mg./l., the system should be pressurized to maintain the concentration of oxygen by using air; if pure oxygen is used, pressure will not be required until the concentration of cyanide is at least about 40 mg./l. CN.

The carbon bed should be made of granular activated carbon for best results with respect to flow rates, adsorptive capacity, and contact time. We prefer to employ carbon of from about #4 to about #60 U.S. Standard Sieve, or having a mesh of about 8 x 30 to 12 x 40. A column configuration is preferred to accommodate a pressurized system, but a gravitational feed may also be used. Provisions for backwashing may be made as is known in the art.

Copper should be added in amounts sufficient to provide cupric copper in the range of from 1 equivalent $Cu^{++}$ to 2 equivalent $CH^-$, to 2 e.p.m. $Cu^{++}$/1 e.p.m. $CN^-$. If carbon impregnated with copper is used, the copper content should be about 2 percent to about 15 percent by weight.

At least 6 mg./l. oxygen should be present in the make-up, and sufficient oxygen should be added to maintain an excess thereof so that at least 4 mg./l. is present in the effluent from the carbon. Oxygen should be present in molar amounts at least equivalent to the cyanide concentration.

For best results the pH of the make-up should be between 6 and 10.

Flow rates may be expressed in terms of gallons per minute per cubic foot of activated carbon. They should not exceed 0.5 gallon per minute per cubic foot. Our preferred range is 0.1 to 0.4 gallon per minute per cubic foot of carbon. This range provides superficial contact times in the range of 75 minutes to 18.75 minutes. The maximum rate of 0.5 gallon per minute per cubic foot is equivalent to a superficial contact time of fifteen minutes.

We claim:

1. Method of removing cyanide from water comprising maintaining in the water from ½ to 2 equivalents $Cu^{++}$ for each equivalent of $CH^-$, maintaining an amount of oxygen in the water which is at least 6 mg./l. and at least equivalent to the $CN^-$ concentration, passing the water through a bed of activated carbon at a rate sufficient to provide a superficial contact time of at least fifteen minutes and regulating the addition of oxygen thereto to maintain the oxygen content of the effluent at least 4 mg./l.

2. Method of claim 1 in which the pH of the water is maintained between 6 and 10.

3. Method of claim 1 including the step of recirculating the water through the carbon bed at least once.

4. Method of claim 1 in which the flow rate through the bed of activated carbon is between 0.1 gallon per minute per cubic foot to 0.4 gallon per minute per cubic foot.

5. Method of removing cyanide from water comprising maintaining in said water oxygen in a concentration of at least 6 mg./l. and at least equivalent to the $CN^-$ concentration, passing said water through a bed of activated carbon impregnated with from about 2 to 15 percent by weight copper, at a rate no greater than 0.5 gallon per minute per cubic foot of carbon thereby providing a superficial contact time of at least fifteen minutes, and regulating the addition of oxygen to the bed to maintain the oxygen content of the effluent at least 4 mg./l.

References Cited
UNITED STATES PATENTS 3,510,424    5/1970    Zumbrunn _____ 210—63

OTHER REFERENCES

Bucksteeg, "Decontamination of Cyanide Wastes by Methods of Catalytic Oxidation and Adsorption," Proceedings of the 21st Industrial Waste Conference, part two, pp. 688–694, published by Purdue University, Lafayette, Ind. 1966.

SAMIH N. ZAHARNA, Primary Examiner

U.S. Cl. X.R.

210—37, 39, 63

UNITED STATES PATENT OFFICE
CERTIFICATE OF CORRECTION

Patent No. 3,650,949　　　　Dated March 21, 1972

Inventor(s) Donald Gene Hager and Joseph Leo Rizzo

It is certified that error appears in the above-identified patent and that said Letters Patent are hereby corrected as shown below:

Col. 1, line 11, "Method" should read --Methods--;

Col. 5, line 27, "CH-" should read --CN- --; Col, 5, line 50, "CH-" should read -- CN- --.

Signed and sealed this 27th day of March 1973.

(SEAL)
Attest:

EDWARD M. FLETCHER, JR.
Attesting Officer

ROBERT GOTTSCHALK
Commissioner of Patents